United States Patent
Krammer et al.

(10) Patent No.: US 10,171,262 B2
(45) Date of Patent: Jan. 1, 2019

(54) METHOD FOR PROVISIONING OF ROOM AUTOMATION COMPONENTS OF A BUILDING AUTOMATION

(71) Applicant: SIEMENS SCHWEIZ AG, Zurich (CH)

(72) Inventors: Lukas Krammer, Vienna (AT); Daniel Lechner, Poysdorf (AT)

(73) Assignee: Siemens Schweiz AG, Zurich (CH)

(*) Notice: Subject to any disclaimer, the term of this patent is extended or adjusted under 35 U.S.C. 154(b) by 0 days.

(21) Appl. No.: 15/697,961

(22) Filed: Sep. 7, 2017

(65) Prior Publication Data
US 2018/0069719 A1 Mar. 8, 2018

(30) Foreign Application Priority Data
Sep. 8, 2016 (EP) ..................... 16187810

(51) Int. Cl.
H04L 12/24 (2006.01)
H04L 12/28 (2006.01)
H04W 4/80 (2018.01)
G05B 15/02 (2006.01)

(52) U.S. Cl.
CPC .......... H04L 12/2814 (2013.01); G05B 15/02 (2013.01); H04L 12/2809 (2013.01); H04L 12/2816 (2013.01); H04L 41/22 (2013.01); H04W 4/80 (2018.02); G05B 2219/2642 (2013.01)

(58) Field of Classification Search
CPC ..... H04L 12/2803; H04L 12/09; H04L 12/14; H04L 12/16; H04L 41/22; G05B 15/02; H04W 4/80
See application file for complete search history.

(56) References Cited

U.S. PATENT DOCUMENTS

| 2015/0198938 A1* | 7/2015 | Steele .................... G05B 15/02 700/275 |
| 2017/0034123 A1* | 2/2017 | Ritmanich ............ H04L 61/103 |
| 2017/0238176 A1* | 8/2017 | Garcia Morchon .. H04W 12/06 726/7 |

FOREIGN PATENT DOCUMENTS

| EP | 2704365 | 3/2014 |
| EP | 2890057 | 7/2015 |
| WO | WO2008/027964 | 3/2008 |

* cited by examiner

Primary Examiner — Leon Flores
(74) Attorney, Agent, or Firm — Cozen O'Connor

(57) ABSTRACT

A method for provisioning and configuring room automation components of a building automation system during an installation and configuration phase, wherein a configuration unit is used for the provisioning and configuring the room automation components, each room automation component is assigned a unique during the installation, a temporary address and a unique recognition code is defined for each room automation component and for an associated, temporary address, which is transferred to the respective room automation component, where a configuration mode is activated, during which the respective recognition code is issued by the respective room automation component. After successful identification and association with the respective associated, temporary address, each identified room automation component is indicated optically on the mobile unit and is selectable in a simple manner for further configuration, whereby the outlay in time is reduced and the flexibility during the installation is increased.

15 Claims, 2 Drawing Sheets

METHOD FOR PROVISIONING OF ROOM AUTOMATION COMPONENTS OF A BUILDING AUTOMATION

BACKGROUND OF THE INVENTION

1. Field of the Invention

The invention generally relates to the field of building technology and building automation and, more specifically, to a method for provisioning and for easier configuration of room automation components of a building automation system during an installation and configuration phase, where a configuration unit, which has a direct connection to the building automation system, is used for the provisioning and configuration of the room automation components.

2. Description of the Related Art

Nowadays many modern and modernized buildings in the commercial and/or public area, as well as in the private area, are equipped with building automation systems to automatically control and regulate lighting, air-conditioning, shading, heating or room climate. To this end, a building automation system can comprise various systems, such as security systems, fire protection systems, lighting control systems, shading systems as well as what are known as HVAC systems (heating, ventilation, air conditioning) with a plurality of components, by which the operation of one or more buildings is monitored, controlled and regulated. A building automation system is thus an important basis for building management. The objective of using a building automation system is usually to perform functional sequences covering a number of disciplines and systems autonomously or automatically based on predetermined parameters and/or to simplify operation or the monitoring of the operation of one or more buildings.

Building automation systems are mostly constructed as decentralized systems and, in addition to components for control of "primary systems" (e.g., generation/distribution of heat and cold), contain a plurality of room automation components with communication capabilities, each with a specific scope of performance, such as sensors, actuators, control units, or operating devices. Only by an interaction between a number of components as an autonomous or automatic functional sequence, such as an activation or regulation of a lighting and/or heating system for a constant light or daylight regulation, is control of the room climate or the room temperature made possible. For an interplay between the respective components and also for convenient operation it is necessary for all components (e.g., sensors, actuators, control units, operating elements, consumers and other technical units) to interact with one another via a communications network, such as a bus system, for an exchange of data. The most important, open and standardized bus systems, which are used for the networking of the components in building automation are, for example, the European Installation Bus (EIB/KNX), which is described in the KNX Standard, or the field bus in accordance with the Local Operating Network (LON) Standard.

A significant basis for an error-free and desired functioning of the building automation system is usually what is referred to as the engineering, which is performed during an installation or during a commissioning or during an expansion of a building automation system. Specifically, what is referred to as the provisioning of room automation components, such as sensors and actuators, plays an important role, through which the respective room automation components are prepared and set up or configured for the respective way in which they function in the building automation system. In this way, the room automation components are integrated into the building automation system. Of significance in such cases for the provisioning and the later operation of the building automation system (i.e., for the interaction between sensors and actuators), is an identification and addressing of the individual components in the building or in a group of buildings. That is, all components of a building automation system must be able to be uniquely identified or accessed via a communications network via an address and their location within a building must be known.

A possible approach to the provisioning and configuration of room automation components, which is used, for example, with building automation systems with an EIB/KNX or LON bus system, is what is known as advance provisioning. In this conventional method, the respective components are addressed and configured in advance in accordance with their future position and function. In advance provisioning, it is necessary however for the respective components for the operation to be installed exactly at the predetermined position in the building or the building complex. This means that for an installation, for example, a complete documentation of the planned building automation system must be available, individual components indicated with the exact installation positions, for example, and the installation personnel have to be notified about these. If documentation of the planned system is incorrect or incomplete, the result can therefore be great additional effort for, e.g., adaptation measures. Installation errors, which can usually only be established in function tests of larger parts of the system, can lead to a malfunction of the entire building automation system and must subsequently be corrected at great expense.

A further possible approach to the provisioning and configuration of components of a building automation system is what is known as on-site provisioning. In this approach, the individual room automation components already installed in the building and connected via the communications network are identified during the installation. For the building, automation systems with EIB/KNX or LON bus system usually employed a manual actuation of hardware keys in combination with an integration into an "engineering component" of the system is required for the on-site provisioning, for example. Usually in such cases, very strict, predetermined processes are to be adhered to, such as the start of a programming mode and an identification of the component in the engineering component in a very short time window. For an on-site provisioning, a physical access to all components distributed in a building, for the actuation of the keys for example, is also necessary. This can be difficult for already installed, built-in or flush-mounted components. With on-site provisioning, it can also be disadvantageous that each component must be individually put into the programming mode and identified. Only when an identification and address allocation of one component is concluded, can the next component be identified and configured. This means that the on-site provisioning for a building automation system with a plurality of components can take a large amount of time. Furthermore, the function or task of the respective component must be visible, i.e., it must already be clear, for example, at the time of the provisioning which switching actuator is responsible for the activation of a respective luminaire for on-site provisioning. If this is not precisely visible during the installation or provisioning from the system documentation, for example, or in the switching cabinet, then in particular a function allocation to a component is only possible with difficultly. Short-duration deviations can thus only be catered for to a very small extent during an on-site provisioning.

SUMMARY OF THE INVENTION

In view of the foregoing, it is an object of the invention to provide a method for provisioning and configuring room automation components of a building automation system with a configuration unit, in which the effort of provisioning or configuring for the first time is reduced, the provisioning is designed more flexibly and expansions or a further engineering of the building automation system are simplified.

This and other objects and advantages are achieved in accordance with the invention by a method in which, in an installation phase, each room automation component is assigned a unique, temporary address by a (mostly central) configuration unit of the building automation system. In addition, for each room automation component and the respective associated temporary address, a unique recognition code is defined and transferred to the respective room automation component. After the installation or assembly of the room automation components, the building automation system is put entirely or partly into a configuration mode. In the configuration mode, the respective installed room automation components are instructed to send out their respective recognition code. The respective recognition code of the respective room automation component is established with the aid of a mobile unit and forwarded to the configuration unit for identification. In this case, the unique identification of the respective room automation component and the respective unique recognition code established by the mobile unit are necessary. After a successful identification and association with the associated temporary address, the respective identified room automation component is indicated on the mobile unit and can then be selected for the further configuration.

The main aspect of the solution proposed by the invention consists of the time outlay involved being able to be significantly reduced for an "engineering process", in particular through use of a unique, temporary address as well as an associated, unique recognition code for each room automation component. The room automation components no longer have to be indicated by a precise installation position or pre-configured, for example. Short-term deviations from a planned layout of the building automation system can also be realized. Furthermore, a likelihood of a misconfiguration through the identification of the respective component is significantly reduced via the unique recognition code and an optical indication of identified, and thereby configurable components on the mobile unit. Expansions of a building automation system can also be performed with the aid of the inventive method in a simple and time-saving way.

In an expedient embodiment of the invention, the respective unique recognition code is sent out by the room automation component as an optical signal and/or as a near field radio signal or as a radio signal with very restricted range, in order to make possible the unique identification of the respective room component. Depending on the embodiment of the respective room automation component or on its installation position, the recognition code can be output by this component either as an optical signal or as a near field radio signal or optical signal and as a radio signal in the configuration phase. Through the detection and establishment of the recognition code with the mobile unit, the respective room automation component can then be identified rapidly and with a low likelihood of error by the configuration unit.

With room automation components that are equipped with a light unit (e.g., LED, display with background illumination) or that interact with a light unit (e.g., actuator for illumination element), this associated light unit necessary for operation can be used for transmitting the recognition code as an optical or light signal. That is, the light unit belonging to or assigned to the respective automation component is used for the output of the recognition code as an optical signal in the configuration phase. A speed of transmission of the recognition code of the optical signal based thereon is governed in such cases by the respective light technology of the light unit of the respective room automation component. Thus, for example, light units such as LEDs as fast signal generators can output the recognition code at a higher speed than slower light units, such as illumination elements such as fluorescent lamps.

As an alternative or in addition, the respective recognition code can be sent out as a near field radio signal by the respective room automation component. In this case, it is important that a position of the transmitter or of the respective room automation component can be determined relatively precisely on receipt of the near field radio signal by the mobile unit. Therefore ideally technologies with a short range, such as Radio-Frequency Identification (RFID) or Near Field Communication (NFC) are used to send out the short-range radio signal. An RFID (Radio-Frequency Identification) chip or NFC (Near Field Communication) chip belonging to the respective room component is then used for the output of the recognition code as a short-range radio signal. An activation of the RFID or NFC chips necessary for the transmission of the recognition code is then (as with the transmission of the recognition code as an optical signal) initiated by the configuration unit at the start of or on activation of the configuration phase. Ideally, room automation components without an associated light unit or, e.g., room automation components built in or already installed are provided with an RFID or NFC chip, in order to enable the recognition code to be sent out as a radio signal. For a faster and better establishment of the recognition code by the mobile unit, a room automation component with a light unit can also be provided with an RFID or NFC chip, for example, and can send out the recognition code additionally as a radio signal.

It is advantageous for a redundant error-correcting code to be used as the unique recognition code. This makes it possible to very easily ensure the recognition code is sent out as free from errors as possible by the respective room automation component. With redundant error-correcting codes transmission, output and/or memory errors will be recognized and if possible corrected based on the redundancy (e.g., in the form of additional bits). Through the use of a redundant error-correcting code an erroneous identification, e.g., based on an erroneous recognition code of the room automation component can be very easily minimized. Furthermore, through the use of a redundant error-correcting code, possible sources of error as a result of different output speeds can be avoided, which arise from an influence of the light technology used (e.g., LED, or fluorescent lamp) on the output speed.

For the mobile unit, in an advantageous manner, at least one unit for detecting or for establishing the recognition code, an optical sensor for detecting a local environment of the mobile unit and a display and input unit, in particular a touchscreen, is made available. Here, for the recognition code sent out as an optical signal, in an advantageous manner the optical sensor of the mobile unit (e.g., camera) can be used for detecting the sent out optical signal. In combination with electronic image processing, the recognition code is established from the optical signal. If the recognition code is sent out by the room component as a radio signal, then the mobile unit, as well as the optical sensor, must also have a unit for receiving and evaluating radio signals (e.g., NFC unit).

Expediently a mobile terminal, such as a smartphone or a tablet PC, is used as the mobile unit. An application located or installed on the mobile unit is used for the activation of the configuration phase and for implementing the configuration. This enables mobile terminals already available to a user or installer to be used very easily, where the application necessary for the configuration phase is easily loaded onto the respective mobile terminal (e.g. smartphone, or tablet PC) or must be installed on the mobile terminal. Furthermore, mobile terminals widely used nowadays, such as e.g. smartphones, or tablet PCs, usually have optical sensors for detecting a local environment or for detecting optical signals (e.g., a camera). Frequently, modern smartphones are now also equipped with a unit for near field communication and thus for detection of radio signals sent out by RFID or NFC chips. Mostly mobile terminals such as smartphones or tablet PCs, also have a display with input capabilities (known as a touchscreen), so that an identified room automation component can be selected in a very simple way for further engineering and then a configuration of the selected component can be performed very easily on the mobile terminal.

It is also useful for those room automation components that are located in the field of view of the optical sensor or of the camera of the mobile unit to be shown on the display and input unit of the mobile unit. Ideally, in such cases, room automation components already identified and associated with the temporary address will be optically indicated. In an advantageous manner room automation components already successfully configured can be optically indicated. The direct optical feedback on the display and input unit of the mobile unit for a successful identification and also possibly for a successful configuration enables the likelihood of a misconfiguration to be significantly reduced. Through the corresponding, optical indication of the room automation components on the display and input unit of the mobile unit, it is clearly visible to the user which components are to be identified, have been successfully identified, are to be configured or have already been successfully configured. The restriction of displays of room automation components in the field of view of the optical sensor of the mobile unit, i.e., only room automation components that are directly detected by the optical sensor or the camera of the mobile unit will be shown on the display and input unit, means that the position of the room automation components in the building or building complex is clearly visible for the user.

A wireless communication connection is used for the communication between the mobile unit and the configuration unit, in particular the transmission of the detected recognition codes of the respective room automation component and of the corresponding feedback for successful identification and configuration. Ideally, a wireless LAN is used for this purpose, which is available on many currently widely used mobile terminals. As an alternative or in addition, Bluetooth can also be used for the wireless communication connection.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described below by way of example on the basis of the enclosed figures, in which.

DETAILED DESCRIPTION OF THE EXEMPLARY EMBODIMENTS

Figure 1:
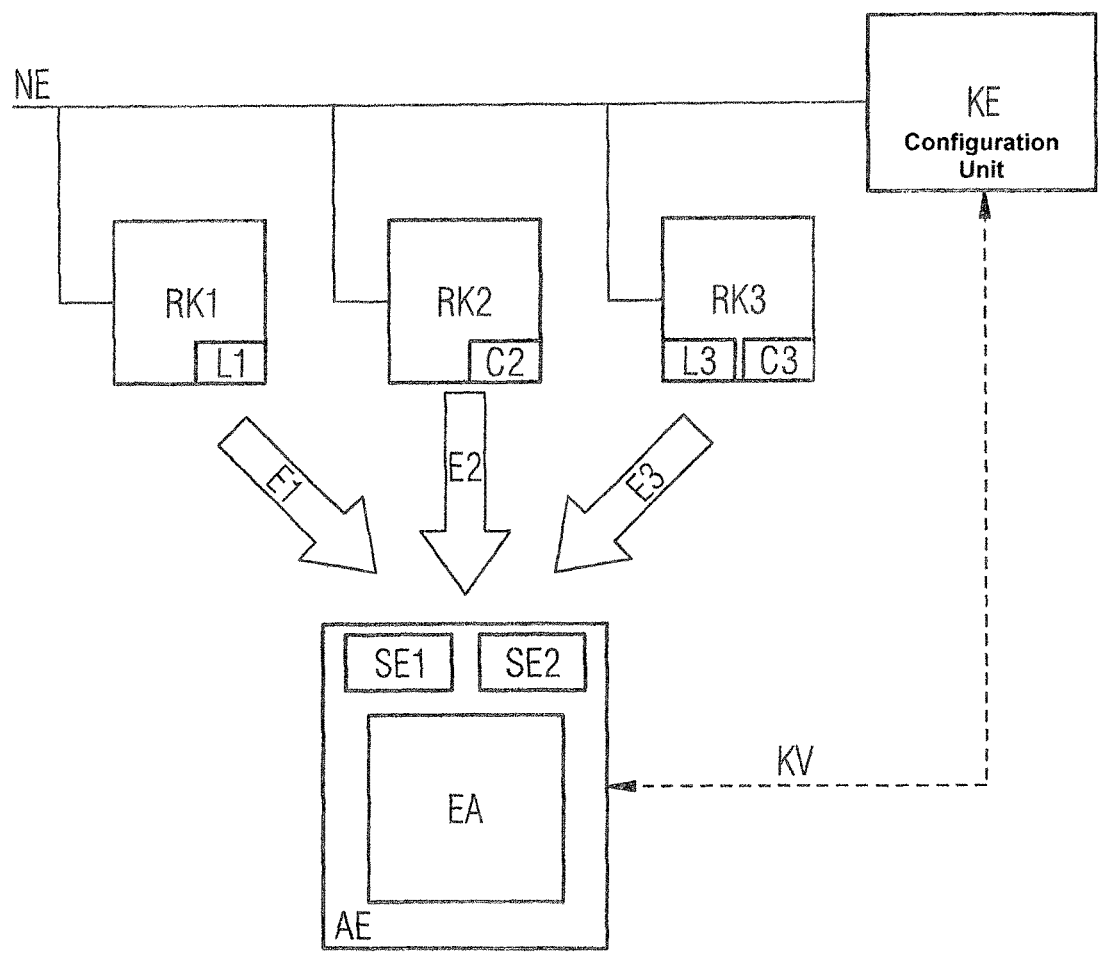
FIG. 1 shows a schematic diagram of an exemplary execution sequence of the method for provisioning and configuring room automation components of a building automation system with a configuration unit, in accordance with the invention.

FIG. 1 shows a schematic diagram of exemplary room automation components RK1, RK2, RK3 to be configured, which are part of a building automation system and which can be used, for example, for activation of lighting, climate-control and/or heating systems. For provisioning and configuring the room automation components RK1, RK2, RK3 a (mostly central) configuration unit KE is used, which can be designed, for example, as what is referred to as backend unit. The configuration unit KE has a direct connection to the building automation system.

The room automation components RK1, RK2, RK3 to be configured are linked into the building automation system during an installation via a communications network NE, such as an EIB/KNX or LON system. In such cases, for an integration of the respective room automation component RK1, RK2, RK3 into the building automation system and for a smooth operation, usually the respective room automation component RK1, RK2, RK3 must be identified and also made uniquely addressable via provisioning and configuration and a position of the respective room automation component RK1, RK2, RK3 in the building automation system must be notified. In accordance with the method of the invention, this is done by each room automation component RK1, RK2, RK3 being allocated a unique, temporary address by the configuration unit KE. A unique recognition code E1, E2, E3 is then defined for each room automation component RK1, RK2, RK3 and the respective associated temporary address by the configuration unit KE. Ideally, a redundant, error-correcting code is used for the respective unique recognition codes E1, E2, E3, which are defined, for example, based on the respective unique, temporary address of the respective room automation component RK1, RK2, RK3.

The unique recognition code E1, E2, E3 defined by the configuration unit KE is transferred to the corresponding room automation components RK1, RK2, RK3. Thus, for the exemplary room automation components RK1, RK2, RK3 shown in FIG. 1, a first room automation component RK1 is assigned a first temporary address and thus a first recognition code E1, a second room automation component RK2 is assigned a second temporary address and a second recognition code E2 and a third room automation component RK3 is assigned a third temporary address and a third recognition code E3 by configuration unit KE.

After conclusion of the installation of the building automation system or of a part of the building automation system (e.g., for an expansion) a configuration mode can be activated for the entire building automation system or for a newly installed part of the building automation system, for example. A mobile unit AE, such as a smartphone and/or a tablet PC, is provided for an activation of the configuration mode, the provisioning and configuration of the room automation components RK1, RK2, RK3. To this end, a corresponding mobile application can be installed on the mobile unit AE, via which the configuration mode can be started.

Through the activation of the configuration mode, the newly installed room automation components or room automation components to be configured RK1, RK2, RK3 are instructed by the configuration unit KE to send out their respective recognition code E1, E2, E3. The recognition code E1, E2, E3 sent out by the respective room automation component RK1, RK2, RK3 can then be established with the aid of the mobile unit AE, where the recognition code E1, E2, E3 can be sent out by the respective room automation component RK1, RK2, RK3 as an optical signal or light signal and/or as a radio signal with a short range or near field radio signal (deepening of form of embodiment and/or installation position of the respective room automation component RK1, RK2, RK3).

Thus, the first exemplary room automation component in FIG. 1, for example, has a light unit L1, such as an LED or a display with backlighting. With the aid of this light unit L1, the unique recognition code E1 of the room automation component RK1 can be sent out as an optical signal or light signal in configuration mode. It is further conceivable for a light unit L1, activated via a room automation component RK1, to be used for transmitting the unique recognition code E1. The optical signal E1 is then detected with the mobile unit AE and is established in combination with an electronic image processing from the optical signal of the unique recognition code E1 of the room automation component RK1.

For room automation components without a light unit or for room automation components built-in or already installed, such as with the second room automation component RK2 shown by way of example in FIG. 1, the associated unique recognition code E2 can be sent out in the configuration mode as near field radio signal E2. For the output of the recognition code E2 as near field radio signal E2, an RFID or an NFC chip C2 belonging to the second room automation component RK2 can be used. This RFID or NFC chip C2 is activated by the configuration unit KE on activation of the configuration mode and then transmits the recognition code E2 via near field communication as radio signal E2. The near field radio signal E2 can be detected when the mobile unit AE is correspondingly close enough and the recognition code E2 established therefrom. In this case, it is important, on receipt of the radio signal E2 by the mobile unit AE, for a position of the room automation component RK2 to be able to be determined relatively precisely.

As an alternative or in addition, a room automation component, such as the exemplary third room automation component RK3 shown in FIG. 1, can also be set up to send out its recognition code E3 both as an optical signal E3 and also as a near field radio signal E3. To this end, the exemplary third room component RK3 has both a light unit L3 (e.g. LED, illuminated display) and also an associated RFID or NFC chip C3, which is activated at the beginning of the configuration mode by the configuration unit KE. The optical signals E3 and the short-range radio signals E3 sent out by the third room automation component RK3 can be detected and evaluated with corresponding local proximity of the mobile unit AE.

The option also exists for the recognition code E1, E3 of the respective room automation components RK1, RK3 to only be sent out as an optical signal or light signal in the configuration. To do this, all room automation components RK1, RK3 of the building automation system or of the respective part to be configured must have a corresponding light unit L1, L3 or activate a corresponding light unit. As an alternative, the recognition code E2, E3 can also be sent out in the configuration mode as just a short-range radio signal or near field radio signal, provided all room automation components RK2, RK3 have a corresponding RFID or NFC chip C2, C3.

For provisioning and configuring the room automation component RK1, RK2, RK3 and also for detecting and establishing the sent out recognition codes E1, E2, E3, the mobile unit AE has at least one optical sensor SE1, such as a camera, a display and input unit EA, and also a unit SE2 for establishing the recognition code E1, E2, E3. With the optical sensor SE1, the room automation components RK1, RK2, RK3 in the field of view of the optical sensor SE1, i.e., in a local environment of the mobile unit AE can be detected. The local environment of the mobile unit AE detected by the optical sensor SE1, such as the room automation components RK1, RK2, RK3 in the optical field of view of the optical sensor, can then be displayed on the display and input unit EA. For simpler handling and easier input, the display and input unit EA can be formed as a touchscreen. As its unit SE2 for establishing the recognition codes E1, E2, E3, the mobile unit AE can have an NFC unit or a sensor with NFC capabilities, where this unit SE2 is used in particular for detecting and establishing recognition codes E2, E3 sent out as a near field radio signal. The optical sensor SE1 of the mobile unit AE can be used for detecting the recognition codes E1, E3 sent out as an optical signal.

After the optical signal and/or radio signal E1, E2, E3 sent out by the respective room automation component RK1, RK2, RK3 is detected by the mobile unit AE or the corresponding recognition code E1, E2, E3 has been established in each case, the detected or established recognition code E1, E2, E3 is transmitted via the communication connection KV from the mobile unit AE to the configuration unit KE. A wireless communication connection, such as Wireless LAN or also Bluetooth, can be used as the communication connection KV.

The respective room automation component RK1, RK2, RK3 is then identified by the configuration unit KE based on the corresponding recognition codes E1, E2, E3. After successful identification, the respective room automation component RK1, RK2, RK3 is associated with the corresponding associated temporary address. Furthermore, a successfully identified room automation component RK1, RK2, RK3 is optically indicated on the display and input unit EA, which displays all room automation components RK1, RK2, RK3 in the field of view of the optical sensor SE1 of the mobile unit AE.

A room automation component RK1, RK2, RK3 indicated optically in this way can then be selected via the display and input unit EA of the mobile unit AE for further configuration.

By selecting a room automation component RK1, RK2, RK3 located in the field of view of the optical sensor SE1 of the mobile unit AE and successfully identified, a user (e.g., installer or operator) can begin the further configuration or the further engineering of the selected room automation component RK1, RK2, RK3. In such cases, different configuration embodiments are possible, for example.

With one possible embodiment a "pre-engineered" configuration (a pre-configured function of the entire building automation system is present), e.g., with the Engineering Tool Software standardized in accordance with the KNX Standard (KNX ETS). An allocation for the respective room automation component RK1, RK2, RK3 is undertaken in accordance with a pre-configured topology. Associated with this, for example, an update from the temporary address of the respective room automation component RK1, RK2, RK3 to a permanent address for the respective room automation component RK1, RK2, RK3 is performed, via which the respective room automation component RK1, RK2, RK3 is able to be accessed in the building automation system. That is, the currently configured room automation component RK1, RK2, RK3 can be selected by the user, for example, from a list of devices existing in the respective configuration in the building automation system.

A further possible configuration embodiment is an "ad-hoc configuration" or "ad-hoc engineering". In such cases, a linkage or a binding is undertaken via pre-defined templates, by which, for example, devices, functionalities and/or inter-relationships are described (e.g., light (key or fan coil) room control device) by an explicit configuration. That is, a template is initially selected. Then, a component RK1, RK2, RK3 (indicated on the display and input unit EA as successfully identified) is selected and assigned and where necessary provided with a specific name. Lastly programming is undertaken via the configuration unit KE, in which template and component RK1, RK2, RK3 are usually logically linked with a programming or engineering tool of the configuration unit KE.

After successful and fully concluded configuration of a room automation component RK1, RK2, RK3, the user can be provided with corresponding optical feedback on the display and input unit EA of the mobile unit AE. The respective optical feedback, when a component RK1, RK2, RK3 has been successfully identified and configured, enables a likelihood of misconfiguration to be significantly reduced and means that a provisioning and configuration status of the newly installed room automation component RK1, RK2, RK3 is visible at all times for the user.

Figure 2:
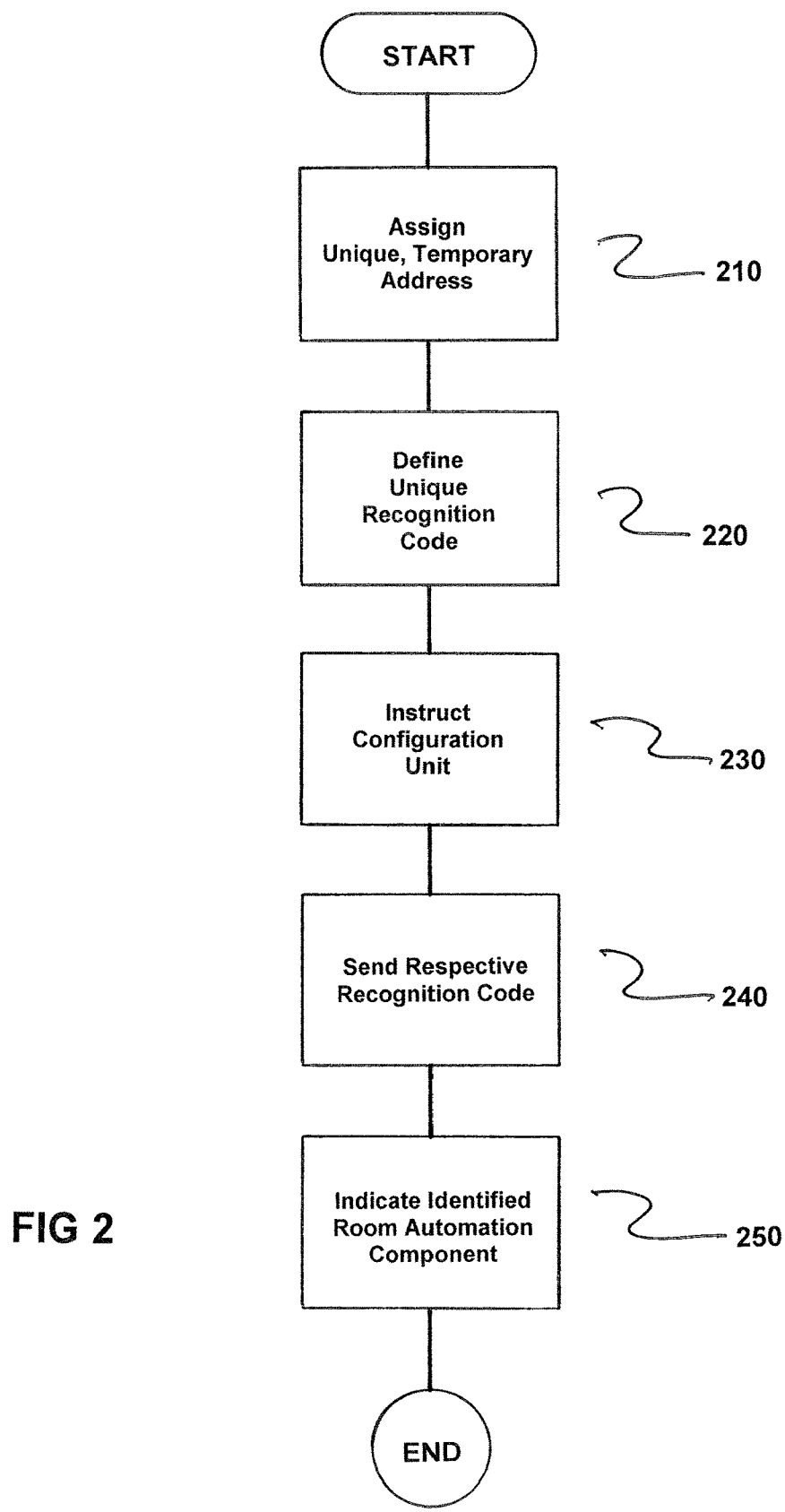
FIG. 2 is a flowchart of the method in accordance with the invention.

FIG. 2 is a flowchart of the method for provisioning and configuring room automation components of a building automation system with a configuration unit KE. The method comprises assigning a unique, temporary address by the configuration unit KE during an installation of room automation components RK1, RK2, RK3, as indicated in step 210.

Next, a unique recognition code E1, E2, E3 is defined for each room automation component RK1, RK2, RK3 of the room automation components RK1, RK2, RK3 and a respective associated temporary address, which is transferred to a respective room automation component RK1, RK2, RK3, as indicated in step 220.

Next, installed room automation components RK1, RK2, RK3 are instructed by the configuration unit KE in a configuration mode to send out their unique recognition code E1, E2, E3, respectively, as indicated in step 230.

Next, each respective recognition code E1, E2, E3 of the respective room automation component RK1, RK2, RK3 established aided by a mobile unit AE is sent to the configuration unit KE for identification, as indicated in step 240.

Each identified room automation component RK1, RK2, RK3 is now indicated optically on the mobile unit AE after successful identification and association with the associated temporary address, as indicated in step 250. In accordance with the invention, each identified room automation component RK1, RK2, RK3 is selectable for further configuration.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for provisioning and configuring room automation components of a building automation system with a configuration unit, the method comprising:

assigning a unique, temporary address by the configuration unit to each room automation component during an installation of the room automation components;

defining a unique recognition code for each room automation component of the room automation components and a respective associated temporary address based on the respective associated temporary address, which is transferred to a respective room automation component;

instructing installed room automation components by the configuration unit in a configuration mode to send out their unique recognition code, respectively;

sending each respective recognition code of the respective room automation component established aided by a mobile unit to the configuration unit for identification; and indicating optically on the mobile unit each identified room automation component which is selectable for further configuration, after successful identification and association with the associated temporary address.

2. The method as claimed in claim 1, wherein the respective recognition code of the respective room automation component is sent out at least one of (i) an optical signal and (ii) a short-range radio signal.

3. The method as claimed in claim 2, wherein a light unit belonging to the room automation component is used for an output of the respective recognition code as an optical signal.

4. The method as claimed in claim 2, wherein one of (i) a radio frequency (RFID) chip and (ii) a near-field communication (NFC) chip belonging to the respective room automation component is used for an output of the respective recognition code as a short-range radio signal.

5. The method as claimed in claim 1, wherein a light unit belonging to the room automation component is used for an output of the respective recognition code as an optical signal.

6. The method as claimed in claim 1, wherein one of (i) a radio frequency (RFID) chip and (ii) a near-field communication (NFC) chip belonging to the respective room automation component is used for an output of the respective recognition code as a short-range radio signal.

7. The method as claimed in claim 6, wherein one of (i) the RFID chip and (ii) the NFC chip belonging to the respective room automation component is activated by the configuration unit.

8. The method as claimed in claim 1, wherein the unique recognition code comprises a redundant, error correcting code.

9. The method as claimed in claim 1, wherein the mobile unit includes at least one optical sensor for detecting a local environment, a unit for establishing the recognition code and a display and input unit.

10. The method as claimed in claim 9, wherein the room automation components in a field of view of the optical sensor of the mobile unit are displayed on the display and input unit of the mobile unit; and wherein identified room automation components are indicated optically.

11. The method as claimed in claim 9, wherein the display and input unit comprise a touchscreen.

12. The method as claimed in claim 1, wherein the mobile unit comprises a mobile terminal; and wherein a mobile application is used to activate and implement configuration of the room automation components of the building automation system.

13. The method as claimed in claim 12, wherein the mobile terminal comprises one of (i) a smartphone and (ii) a tablet personal computer (PC).

14. The method as claimed in claim 1, wherein the mobile unit is connected to the configuration unit via a wireless communication connection.

15. The method as claimed in claim 14, wherein the wireless communication connection comprises a wireless local area network.

* * * * *